United States Patent [19]

Mizumoto et al.

[11] 4,272,709
[45] Jun. 9, 1981

[54] CIRCUIT FOR CONTROLLING THE DRIVE OF MOTOR

[75] Inventors: Katsuji Mizumoto; Toshihide Hanada, both of Sayama; Yasuo Kominami, Kokubunji; Masahiro Yamamura, Kodaira, all of Japan

[73] Assignees: Pioneer Electronic Corporation; Hitachi, Ltd., both of Tokyo, Japan

[21] Appl. No.: 58,872

[22] Filed: Jul. 18, 1979

[30] Foreign Application Priority Data

Jul. 19, 1978 [JP] Japan .................................. 53-88043

[51] Int. Cl.³ .............................................. H02P 5/16
[52] U.S. Cl. ..................................... 318/317; 318/327; 318/331
[58] Field of Search ............... 318/331, 317, 326, 327; 323/22 T

[56] References Cited

U.S. PATENT DOCUMENTS

| | | | |
|---|---|---|---|
| 3,231,808 | 1/1966 | McDaniel | 318/331 |
| 3,538,424 | 11/1970 | Frederiksen | 323/22 T |
| 3,599,063 | 8/1971 | Nanai et al. | 318/327 |
| 3,624,493 | 11/1971 | Gately | 323/22 T |
| 3,808,482 | 4/1974 | Wagensonner et al. | 318/331 |
| 4,095,164 | 6/1978 | Ahmed | 323/22 T |
| 4,168,454 | 9/1979 | Gmeinder | 318/331 |

Primary Examiner—David Smith Jr.
Attorney, Agent, or Firm—Craig & Antonelli

[57] ABSTRACT

The present invention is related to a temperature-compensated circuit for controlling the drive of a motor, comprising a differential comparator for comparing a running-speed signal of a motor with a reference signal, and a feedback amplifier having a differential amplifier to which is given an input offset.

4 Claims, 1 Drawing Figure

CIRCUIT FOR CONTROLLING THE DRIVE OF MOTOR

BACKGROUND OF THE INVENTION

The present invention relates to a circuit for controlling the drive of a motor, which is stable with respect to the changes in temperature.

FIG. 1 shows a general speed control system for motors. That is, the speed control system forms a loop in which when a motor 1 is running, a voltage proportional to the running speed is obtained by a speed/voltage converter 2, the obtained signal and a voltage of a reference signal source 3 are compared with each other by a comparator 4, the compared output is amplified by an amplifier 5, and the amplified output is used to drive the motor. In order for the motor 1 to run at a predetermined speed, however, an offset must be given to a differential amplifier constituting the comparator 4. In practice, however, when there was an offset in the input, the differential amplifier could not equalize the temperature characteristics of base-emitter voltage $V_{BE}$ which was dependent upon a collector current, whereby the temperature drift was developed causing the running speed of the motor to be greatly varied.

SUMMARY OF THE INVENTION

The object of the present invention therefore is to provide a circuit for controlling the drive of motor, which is capable of stably maintaining the running speed irrespective of the changes in temperature.

According to the present invention, an offset is not given to a differential amplifier but is given to an amplifier, whereby the gain of the amplifier is restrained to a small value and a temperature drift caused by the offset is compensated by a sufficiently great feedback quantity in the amplifier, in order to minimize adverse effects caused by the change in temperature in the loop which controls the motor speed.

DESCRIPTION OF THE PREFERRED EMBODIMENT

Figure 1:
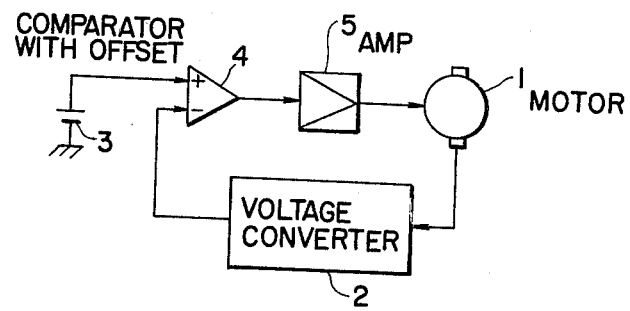
FIG. 1 is a fundamental block diagram of a conventional circuit for controlling the drive of motor.
Figure 2:
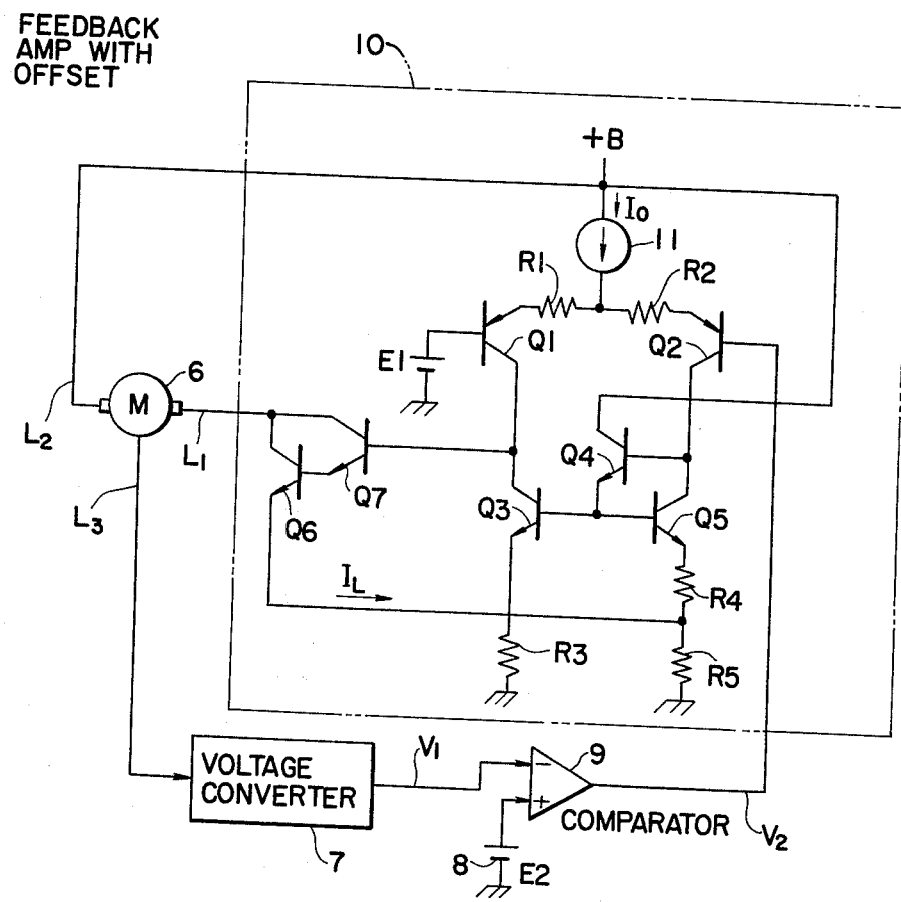
FIG. 2 is a block diagram according to an embodiment of the present invention.

FIG. 2 is a block diagram showing an embodiment of the present invention, in which reference numeral 6 represents a motor. Running speed of the motor is controlled by electric currents suppled to input windings $L_1$ and $L_2$. An alternating voltage proportional to the running speed is produced on an output winding $L_3$. Reference numeral 7 denotes a voltage converter for converting the a-c voltage produced by the motor into a d-c voltage corresponding to the running speed. Reference numeral 9 denotes a comparator which compares a d-c output voltage of the voltage converter 7 with a reference voltage $E_2$ of a reference signal source 8. Reference numeral 10 designates a feedback amplifier which, upon receipt of an output voltage $V_2$ of the comparator 9, supplies a control current to the winding $L_1$ of the motor 6.

According to the present invention, no offset is given to the comparator 9. As a result, no temperature drift is developed in the differential amplifier constituting the comparator 9. In other words, it is allowed to equalize the collector currents of a pair of bipolar transistors which are connected in a differential manner to constitute a differential amplifier, whereby it is made possible to prevent the output current from being varied by the change in temperature. The offset, however, is given to the feedback amplifier 10. Furthermore, the feedback quantity of the amplifier is sufficiently increased to compensate the temperature drift.

The feedback amplifier 10 is constructed as mentioned below. A power supply +B is connected via a current source 11 to the differential amplifier consisting of bipolar transistors Q1 and Q2 having emitter resistors R1 and R2, a reference voltage E1 is connected to the base of the transistor Q1 and the base of the transistor Q2 is connected to the output of the comparator 9. An active load consisting of transistors Q3 to Q5 which are connected in a current-mirror manner is connected to the differential amplifier consisting of transistors Q1 and Q2, whereby the transistor Q3 is grounded via an emitter resistor R3, and the transistor Q5 is grounded via an emitter resistor R4 and a current-detecting resistor R5. A point at which the collectors of the transistors Q1 and Q3 are connected together is connected to the base of a transistor Q7 which is Darlington-connected with respect to a transistor Q6 to drive the motor, the emitter of the transistor Q6 is connected to the current-detecting and feedback resistor R5, and the collectors of the transistors Q6 and Q7 are connected to one terminal of the motor 6.

Operation of the thus constructed circuit is mentioned below. When the motor 6 is running at a predetermined speed, the input offset voltage to the differential amplifier of the comparator 9 has been set at zero, whereby the positive and negative input voltage of the differential amplifier and its output voltage become $V_1 \approx V_2 \approx E_2$. Hence, when the motor is rotated at a rated speed, the effects caused by the temperature change in the comparator 9 can be eliminated. Referring to the feedback amplifier 10, on the other hand, if a potential difference between the two bases of the transistors Q1 and Q2 is denoted by $(E_1 - V_2) = V_x$, and a current of the current source 11 by Io, a motor current $I_L$ can be given by the following equation, $$I_L = \frac{(R3 + R4)(I_o R2 - V_x) - I_o R4 (R1 + R2)}{R5 (R1 + R2)}$$

Here, if the resistors have a relation R1=R4=Ra, R2=R3=Rb, and Vx=0, the motor current $I_L$ can be given by, $$I_L = \frac{I_o}{R5}(Rb - Ra)$$

If $\alpha = Ra/Rb$, $$\alpha = 1 - \frac{I_L \cdot R5}{I_o \cdot Rb}$$

As will be obvious from the above, if the resistance Rb is selected to be greater than R5, i.e., Rb >> R5, and if the current Io is suitably selected, the value $\alpha$ will be obtained. In other words, in order to obtain an input offset, the resistances R5, Rb and current Io should be so set that $$\frac{I_L \cdot R5}{I_o \cdot Rb} < 1.$$

Thus, if the resistances are so selected that R1=R4=Ra and R2=R3=Rb, if the ratio α of the resistance Ra to the resistance Rb is suitably set, and if the resistance of either one of the two resistors is suitably selected, it is possible to obtain a rated current $I_L$ of the motor with Vx=0.

According to the present invention as mentioned above, a rated motor current can be easily obtained by setting at zero the potential difference between the bases of the transistors Q1 and Q2 which constitute the differential amplifier of the feedback amplifier 10, by suitably selecting the resistances R1 to R4, and by determining the resistance of either side. Further, the comparator 9 which has been so set that there is no offset when the motor is running at a rated speed, is not adversely affected by the temperature. The temperature drift stemming from the offset in the feedback amplifier 10 can be prevented by a sufficiently great current feedback in the feedback amplifier.

What is claimed is:

1. A circuit for controlling the running speed of a motor comprising; a comparator for comparing a speed signal produced responsive to the running speed of said motor with a reference signal, said comparator having substantially no offset; and a feedback amplifier including a differential amplifier for receiving an output signal from said comparator, an output circuit for feeding a drive current to said motor upon receipt of an output from said differential amplifier and a current feedback loop connected between said output circuit and said differential amplifier, said feedback amplifier having an offset, one end of said motor being directly connected to a first operating potential, another end of said motor being connected to a second operating potential through said output circuit and said current feedback loop, said drive current being based upon said offset of said feedback amplifier and flowing through the series path of said motor, said output circuit and said current feedback loop between said first operating potential and said second operating potential.

2. A circuit for controlling the running speed of a motor as set forth in claim 1, wherein said differential amplifier comprises; a first transistor and a second transistor connected in a differential from, of which the emitters being connected to an one end of a circuit of constant current supply via a first emitter resistor and a second emitter resistor, respectively, another end of said circuit of constant current supply being connected to said first operating potential; a third transistor and a fourth transistor of which the collectors are connected to the collectors of said first and second transistors, respectively; a third emitter resistor and a fourth resistor being respectively connected between said second operating potential and the emitters of said third and fourth transistors; and means for connecting the collector of said fourth transistor to the base thereof in order to form a current-mirror circuit by way of said third and fourth transistors; and said output circuit comprises Darlington-connected transistors; wherein the resistance of said first emitter resistor is different from the resistance of said second emitter resistor.

3. A circuit for controlling the running speed of a motor as set forth in claim 2, wherein said differential amplifier supplies a rated load current as a driving current to said motor when the potential difference between the potentials applied to the bases of said first and second transistors is zero.

4. A circuit for controlling the running speed of a motor as set forth in claim 2, wherein said fourth emitter resistor includes a resistance for negative feedback, and said resistance for negative feedback is coupled to said output circuit.

* * * * *